United States Patent
Veasaw et al.

[15] 3,644,914
[45] Feb. 22, 1972

[54] SLUDGE INDICATOR FOR SEPTIC TANKS

[72] Inventors: James J. Veasaw, Middle Settlement Road, New Hartford, N.Y. 13413; John P. Magyar, 1218 Kellog Avenue, Utica, N.Y. 13502

[22] Filed: Nov. 21, 1969

[21] Appl. No.: 878,833

[52] U.S. Cl............................................340/236, 250/218
[51] Int. Cl........................................................G08b 21/00
[58] Field of Search............340/236, 237, 228 S, 228, 247; 250/218; 73/290; 356/208

[56] References Cited

UNITED STATES PATENTS

| | | | |
|---|---|---|---|
| 1,958,252 | 5/1934 | Singleton et al. | 340/247 |
| 3,025,962 | 3/1962 | Williams | 250/218 X |
| 3,314,058 | 4/1967 | Osborne | 340/228 |
| 3,358,507 | 12/1967 | Montgomery | 73/290 |

FOREIGN PATENTS OR APPLICATIONS 838,674  12/1938  France..................................250/206

Primary Examiner—John W. Caldwell
Assistant Examiner—Daniel Myer
Attorney—Donald P. Gillette

[57] ABSTRACT

An opaque sensing device having a light-dependent resistor and a light source spaced apart so that material to be analyzed can be passed between them. The light-dependent resistor is connected to an impedance, such as a series resistor, across a voltage source to cause a fraction of the voltage to be present across the light-dependent resistor. A light source, such as a neon bulb, provides the only illumination to the resistor, and the impedance of the latter is therefore a measure of the opacity of the light path. When this sensing system is immersed in a septic tank, the buildup of sludge in the tank eventually reaches a level at which the light is interrupted, and the resistance of the light-dependent resistor changes, resulting in a change in voltage across it. This voltage is measured by an indicator outside of the septic system to determine when the sludge level has reached the immersed unit. The indicator may consist of a second neon bulb electrically connected across the light-dependent resistor. A normally closed switch may also be connected in series with the light source to interrupt current to the latter in order to create the effect of opaque matter to determine whether the indicator light will properly show a condition of opacity.

1 Claims, 2 Drawing Figures

Patented Feb. 22, 1972

3,644,914

INVENTORS
James J. Veasaw
John P. Magyar by *Donald P. Gillette*

ATTORNEY 3,644,914

SLUDGE INDICATOR FOR SEPTIC TANKS

FIELD OF THE INVENTION

This invention relates to the measurement of opacity of a light path between a source and a light-dependent resistor and particularly to the measurement of opacity of a light path in a closed septic system where the opacity may be due to the buildup of sludge from the bottom of the septic tank to the level of an indicator unit.

BACKGROUND OF THE INVENTION

Septic systems normally comprise a tank that receives sewage directly from a source and allows the sewage to settle and to be attacked by anaerobic bacteria and other micro-organisms before dispersing the partially digested effluent into a field for further distribution of the modified material. Over a period of time sludge that cannot be further digested builds up on the bottom of the tank to a level at which it interrupts the operation of the septic system and necessitates either rebuilding the system or cleaning it out. Before the sludge builds up to a dangerously high level, it is desirable to remove it from the system, but since the buildup can take place over a period of a good many years during which it is unlikely that records will be kept that will adequately reflect the approximate buildup, an indicator system that will produce an external indication of excessive sludge level it most desirable.

It is one of the principal objects of the present invention to provide a simple electrical system for indicating the buildup of sludge in a septic system by measuring the opacity of a light path between the light source in the septic system and a light dependent resistor also located in the septic system spaced apart from the light source.

BRIEF DESCRIPTION OF THE INVENTION

The present invention comprises a light source and a light-dependent resistor, preferably mounted as a unit immersed to a predetermined depth in a septic tank. Electrical connections from the indicator unit are carried through the wall of the tank to a control unit which may be located in a house or other building from which sewage is directed into the septic tank. The control unit includes means for connection to a operating voltage for the light source and to provide an energizing current for the light-dependent resistor. The light-dependent resistor is connected in a circuit with an impedance and an indicator so that the voltage across the light-dependent resistor, which is a function of the illumination from the light source, will produce a corresponding reading on the indicator. In one simple form of the invention the impedance may be a series resistor connected to the light-dependent resistor, and the indicator may be a neon light connected directly in parallel with, although physically spaced some distance from, the light-dependent resistors of the type used in the present invention may have impedance characteristics such that their impedance will be markedly lower in the presence of light than in darkness. As long as the optical path between the source of illumination and the light-dependent resistor is not excessively obscured by solid material, the light-dependent resistor will have a relatively low impedance and the neon light indicator thereacross will not have sufficient voltage to operate. However, when the light path is obscured by sludge or other solid material, the impedance of the light-dependent resistor will rise, resulting in higher voltage across it. If the light path is sufficiently obscure, the voltage across the light-dependent resistor will be enough to ignite the neon indicator light showing that the sludge level in the septic system has reached a level such that the septic system needs to be cleaned out or replaced.

In order to be sure that the indicator system is working it is desirable to provide a switch to interrupt current to the light source hidden in the septic tank. This interruption of current produces the same effect as a high sludge level and should cause it to produce a corresponding indication. If it does not, something is wrong with the electrical system and it cannot be depended upon to give an indication of sludge level and so should be investigated or replaced.

BRIEF DESCRIPTION OF THE DRAWINGS

The invention will be described in detail in accordance with the present invention.

Figure 1:
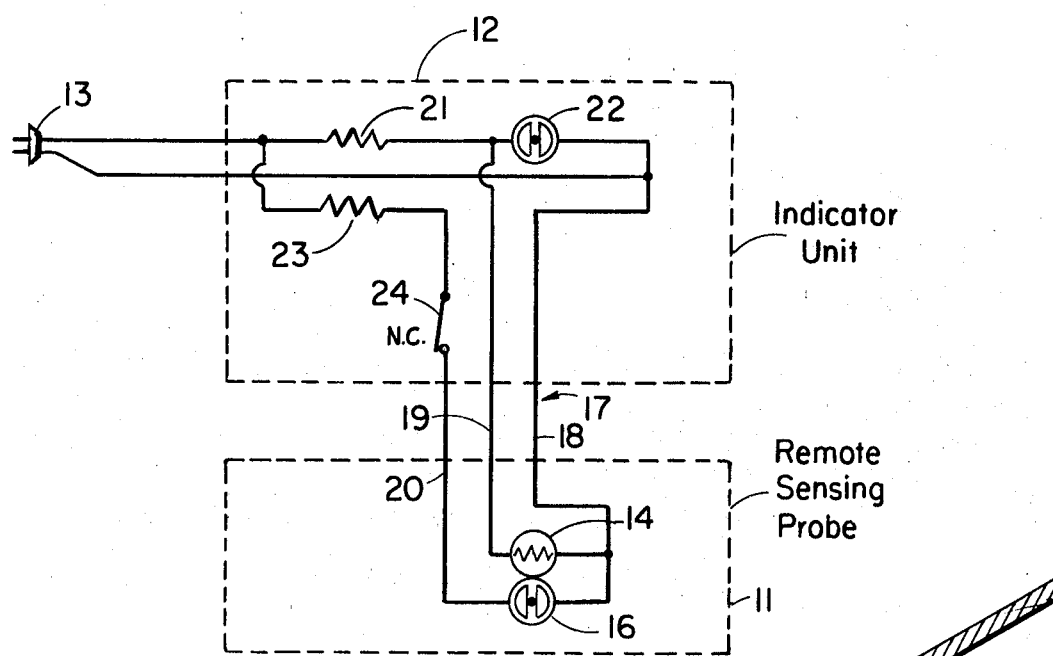
FIG. 1 is a schematic wiring diagram of a sensing system according to the present invention.

The indicating circuit in FIG. 1 comprises two units: a remote sensing probe 11 and an indicating unit 12 connected by a powerline 13 to an ordinary source of house current. The sensing probe 11, which is to be placed in a septic tank, includes a light-dependent resistor 14 and a light source 16, which, in the present embodiment, is a neon light bulb. The remote sensing probe is connected to the indicator unit 12 by a cable 17 comprising three wires 18–20.

The indicator unit itself includes an impedance 21 connected in series with the wire 19 and the light-dependent resistor 14. In one practical embodiment of the invention, the impedance 21 was a resistor having a resistance of 27,000 ohms. Connected in series with the resistor 21 and in parallel with the light-dependent resistor 14 is an indicator in the form of another neon bulb 22. The resistor 21 and the neon bulb 22 forms a series circuit directly across the two wires of the powerline 13, and the resistor 21 acts as a dropping resistor to limit the current through the neon bulb 22 when the latter is on.

Also located in the indicator unit 12 is another resistor 23 connected in series with a normally closed switch 24 and the wire 20 to the neon bulb 16. Like the resistor 21, the resistor 23 serves as a limiting impedance during the time that the neon bulb 16 is activated and may have a typical value of 47,000 ohms. The switch 24 is preferably of the spring return type which is normally closed but may be held open as long as pressure is applied to it to open the circuit between the resistor 23 and the neon bulb 16.

Figure 2:
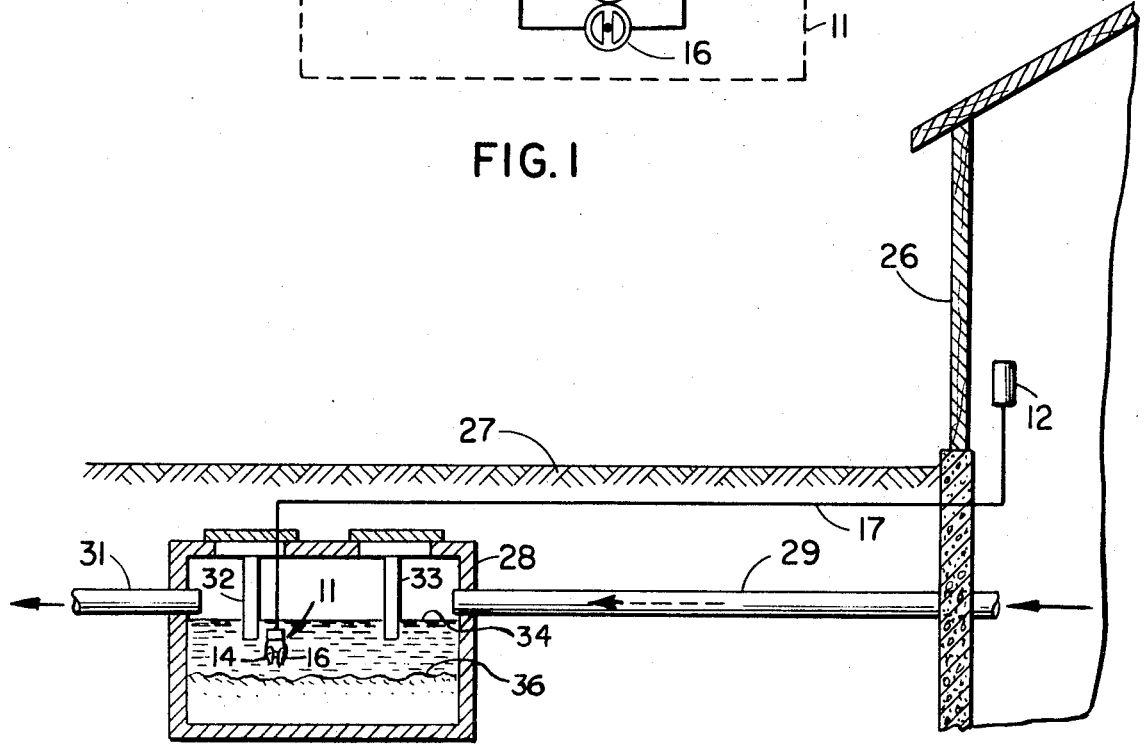
FIG. 2 is a simplified cross-sectional representation of septic system utilizing the indicator system of FIG. 1.

The environment in which the apparatus of FIG. 1 would normally be operated is shown in FIG. 2. This figure includes a fragmentary cross-sectional view of a house 26 within which the indicator unit 12 through the foundation of the house and under the surface of the ground 27 to a septic tank 28 outside of the house. It passes through the wall of the septic tank and connects with the remote sensing probe 11 inside the tank.

The septic tank 28 is connected by a sewer pipe 29 to the main sewer from the house 26 and in turn has one or more outlet pipes 31 from which effluent may pass to the customary field (not shown). The septic tank 28 contains two baffles and has a quantity of liquid 34 on top of the layer of sludge.

The remote sensing probe 11 is suspended within the liquid 34 and has a generally U-shaped configuration with the light-dependent resistor 14 on one side and the neon light 16 on the other side of an open channel through which the liquid 34 and any material contained therein is free to pass. When the septic system is initially put into operation, there is no sludge 36 at all in the tank 28, but raw sewage passes into the tank through the sewerline 29, anaerobic bacteria and other micro-organisms act upon the organic materials therein and reduce some of it to a liquid form that can pass through the pipe 31. A certain portion of the raw sewage is transformed into, or remains as, solid matter that falls to the bottom of the tank 28 as sludge. As long as the upper level of the sludge 36 remains sufficiently below the barriers 32–33 and the inlet and outlet pipes 30–31, the septic tank 28 will normally operate properly. However, as the sludge builds up to too high a level, either that raw sewage will back up in the sewerline 29 or will flow straight through to the outlet pipe 31 and will be transmitted to the field, which is not equipped to digest the organic materials.

By placing the sensing probe 11 somewhat below the maximum acceptable sludge level, preferably below the level of the barriers 32 and 33, the buildup of sludge will gradually introduce solid, opaque material into the open spaces between the light-dependent resistor 14 and the neon light source 16. When the light path between these two electrical components has been sufficiently interrupted, the resistance of the light-dependent resistor will increase to the point at which the indicator unit 12 will be actuated.

Referring back to FIG. 1, the actuation of the indicator unit 12 arises when the resistance of the light-dependent resistor 14 reaches a value such that the divided voltage across it, considering the resistor 21 and the light-dependent resistor 14 to constitute a voltage divider, becomes high enough to actuate the neon light 22.

It should be noted that floating opaque material within the liquid 34 can momentarily interrupt the light path between the light-dependent resistor 14 and the neon light 16 but will usually sink to the bottom and form part of the sludge 34 solid. The momentary interruption of the light path may cause a corresponding momentary illumination of the neon light bulb 22 in the indicator unit 12, but if the indicator bulb 12 subsequently goes off and can be turned back on by actuation of the switch 24, it is not necessary to clean out the septic tank.

Preferably the sensing probe 11 should be placed low enough so that the septic tank can still continue to operate after the indicator bulb 22 has remained continuously illuminated for some time.

What is claimed is:

1. An opaque matter sensing device comprising:
   a. a light-dependent resistor;
   b. a first voltage-dropping resistor connected in series with said light-dependent resistor to form a circuit for connection to a source of voltage whereby there will be a portion of said voltage across said light-dependent resistor corresponding to light striking said light-dependent resistor;
   c. a first gas discharge light connected directly in parallel with said light-dependent resistor to form a parallel circuit in series with said voltage-dropping resistor to indicate the voltage across said voltage-dropping resistor;
   d. a second gas discharge lamp adjacent said light-dependent resistor but physically spaced therefrom to permit material that is to be investigated to pass between said light source and said light-dependent resistor;
   e. a second voltage-limiting resistor connected in series therewith; and
   f. a normally closed switch connected in series with said second gas discharge light to interrupt actuating current thereto to turn said second gas discharge light off and thereby test the operation of said light-dependent resistor.

* * * * *